United States Patent
Alfano et al.

(10) Patent No.: US 12,066,368 B2
(45) Date of Patent: Aug. 20, 2024

(54) COMPACT OPTICAL VIRUS DETECTION ANALYZER OF NANO- AND MICRO-SIZE BIO PARTICLES USING LIGHT SCATTERING AND FLUORESCENCE

(71) Applicants: Robert R. Alfano, Bronx, NY (US); Lingyan Shi, San Diego, NY (US); Binlin Wu, Forest Hills, NY (US)

(72) Inventors: Robert R. Alfano, Bronx, NY (US); Lingyan Shi, San Diego, NY (US); Binlin Wu, Forest Hills, NY (US)

(*) Notice: Subject to any disclaimer, the term of this patent is extended or adjusted under 35 U.S.C. 154(b) by 0 days.

(21) Appl. No.: 17/503,086

(22) Filed: Oct. 15, 2021

(65) Prior Publication Data
US 2022/0120656 A1 Apr. 21, 2022

Related U.S. Application Data

(60) Provisional application No. 63/092,084, filed on Oct. 15, 2020.

(51) Int. Cl.
*G01N 15/06* (2024.01)
*B01L 3/00* (2006.01)
(Continued)

(52) U.S. Cl.
CPC .......... *G01N 15/0612* (2013.01); *B01L 3/508* (2013.01); *B01L 2200/025* (2013.01);
(Continued)

(58) Field of Classification Search
CPC ....... G01N 15/0612; G01N 2015/0065; G01N 2015/0693; B01L 3/508; B01L 2200/025;
(Continued)

(56) References Cited

U.S. PATENT DOCUMENTS 6,214,560 B1 * 4/2001 Yguerabide ......... G01N 33/585
506/3
2002/0028439 A1 * 3/2002 Saifer .................. G01N 21/49
435/5
(Continued)

FOREIGN PATENT DOCUMENTS

WO WO-2007011854 A2 * 1/2007 ......... G01N 15/0205
WO WO-2013013229 A1 * 1/2013 ......... G01N 15/1459

OTHER PUBLICATIONS

Kaye, P.H. et al. (2000). "Simultaneous light scattering and intrinsic fluorescence measurement for the classification of airborne particles." Applied Optics. 39(21). (Year: 2000).*

*Primary Examiner* — Jill A Warden
*Assistant Examiner* — Jacqueline Brazin
(74) *Attorney, Agent, or Firm* — Myron Greenspan

(57) ABSTRACT

A Compact Optical Virus Detection Analyzer (COVDA) uses light scattering and fluorescence to detect nanometer (nm) and micrometer (um) sized particles, such as biological particles and can be used to detect viruses such as coronavirus including SAR-CoV-2 responsible for COVID-19, pollen and bacteria. It can be used for prescreening, rapid detection of suspicious people. COVDA involves experimental and theoretical methods for particle and virus detection using Tryptophan as a key biomarker. Light sources in compact units include lamps such as Xenon (Xe) lamp with narrow band filters, LEDs (such as AlN) or laser diode, Q switched and mode lock Lasers for nanosecond and picosecond pulses (such as Nd Yag/Glass, Ti sapphire with Harmonic generator) in blue from 400 nm to 500 nm to generate second harmonic generation (SHG) in KDP/BBO crystals to produce 200 nm to 250 nm emission, or green laser pointers at about 530 nm to get emitters with harmonic crystals at about 270 nm or LEDS from 230 nm to 300 nm for pumping the samples at 230 nm to 289 nm to pump (Continued)

tryptophan and light scatter of nanometer particles of virus. The ultra high power ns and ps lasers in mJ to J can level can be used to locate Bio virus bacteria clouds in free space to image and destroy and kill virus.

17 Claims, 6 Drawing Sheets

(51) Int. Cl.
*G01N 15/00* (2024.01)
*G01N 15/01* (2024.01)
*G01N 15/075* (2024.01)

(52) U.S. Cl.
CPC .................. *B01L 2300/0609* (2013.01); *B01L 2300/0654* (2013.01); *B01L 2300/0663* (2013.01); *B01L 2300/168* (2013.01); *G01N 15/01* (2024.01); *G01N 15/075* (2024.01)

(58) Field of Classification Search
CPC ..... B01L 2300/0609; B01L 2300/0654; B01L 2300/0663; B01L 2300/168
USPC .............................................................. 435/5
See application file for complete search history.

(56) References Cited

U.S. PATENT DOCUMENTS

2002/0177777 A1* 11/2002 Nordstrom ........... A61B 5/0071 600/475
2008/0093566 A1* 4/2008 Reinisch ................ G01N 21/85 250/461.2
2010/0291537 A1* 11/2010 Souza ................ A61K 47/6901 435/5
2010/0328665 A1* 12/2010 Kaye ....................... G01J 3/021 356/342
2017/0227466 A1* 8/2017 Lo .......................... G01N 21/53
2022/0018773 A1* 1/2022 Prater ................... G01J 3/0227

* cited by examiner

COMPACT OPTICAL VIRUS DETECTION ANALYZER OF NANO- AND MICRO-SIZE BIO PARTICLES USING LIGHT SCATTERING AND FLUORESCENCE

CROSS-REFERENCE TO RELATED APPLICATION

This application claims priority to U.S. Provisional Patent Application No. 63/092,084 filed Oct. 15, 2020, the contents of which are incorporated herein by reference.

BACKGROUND OF THE INVENTION

1. Field of the Invention

The invention generally relates to pathogen detection devices and, more specifically, to a compact optical virus detection analyzer of nano- and micro-size bio particles using light scattering and fluorescence.

2. Description of the Prior Art

During 2002-2003 coronavirus SARS-CoV infected about 8000 people with about 10% fatality rate [9]. In 2012, more than 1700 people were infected by coronavirus MERS-CoV with about 36% fatality rate [10]. This year, the ongoing outbreak of the coronavirus (SARS-CoV-2) disease, also known as COVID-19 has affected 235 countries over the world and caused about 1,070,000 deaths [11]. The coronavirus causes widespread diseases, threatens human health and causes economic loss globally [12]. What is needed as the first line of defense against pathogens is a compact size analyzer to detect the potential presence of the pathogen—virus. An affordable at-home rapid reliable testing device can significantly increase the testing volume and frequency, reduce burdens on the health care system, and may significantly increase the chance of early detection and improve patient management. Such devices should be able to make rapid or even real-time, and yet reliable tests. It may even require the sample collection process to be minimally uncomfortable. However, currently it does not appear that there are such commercial devices available in the market.

The currently available diagnostic testing methods include molecular test, e.g. reverse transcription polymerase chain reaction (RT-PCR), antigen test and antibody tests [10]. The testing time varies from minutes to several days. The accuracy also varies [10, 11]. The molecular test is accurate but may take several days. Usually the tests are carried out by trained professionals either at a testing site or a specialized laboratory [12] though some tests involve at-home collection [10]. Testing is key to the disease control and economic recovery. Studies showed that for surveillance and mitigation, what matters most is the frequency with which people are tested, and the speed with which actions are taken on results [13]. Experts suggested that "frequent testing of big groups of people may be the only way to stop this virus", which may require people "to start accepting less accurate, widespread testing for groups" [13].

SUMMARY OF THE INVENTION

There is a current and future need to detect pathogens in situ to help humans cope with the spread of disease. Disclosed is a compact, portal and affordable real-time optical unit for at-home screening of viruses, particularly the coronavirus, also known as SARS-CoV-2.

Disclosed, as first line of defense against pathogens, is a compact size analyzer (Compact Optical Virus Detection Analyzer—"COVDA") that uses light scattering and fluorescence to detect nanometer (nm) and micrometer (um) sized particles, such as biological particles using light scattering and fluorescence signals to detect potential presence of a pathogen—a virus. An affordable at-home and businesses rapid reliable testing device COVDA can significantly increase the testing volume and frequency, reduce burdens on the health care system, and may significantly increase the chance of early detection and improve patient management. Such COVDA devices should be able to make rapid or even real-time, and yet reliable testing. It may even require a sample collection process to be minimally uncomfortable. Currently there are no such known commercial devices available in the market. The current invention uses the makeup of virus and bacteria that contain a significant amount of Tryptophan as the key bio fingerprint marker for detection and kill the bio media.

A multidisciplinary program based on well-known optical science approaches is used to develop a compact, portal and affordable real-time optical unit for at-home screening of viruses, particularly the coronavirus. The device uses optical spectroscopy and photonics technologies based on light scattering of small particles as well as molecular fluorescence spectroscopy focusing on Tryptophan, one of the key features and nanometer and micrometer size particles of the bio media. One determines the size and emission of the virus and bacteria in spectral zone of 200 nm to 350 nm, in particular about 280 nm. The fingerprint region is useful to detect and kill virus.

BRIEF DESCRIPTION OF THE DRAWINGS

The above and other aspects, features and advantages of the present invention will be more apparent from the description when taken in conjunction with the accompanying drawings, in which.

DETAILED DESCRIPTION

Figure 6:
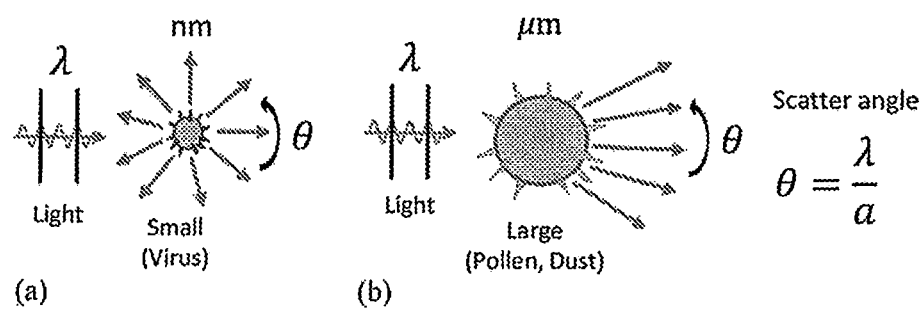
FIG. 6 are schematic diagrams that show scattering for particles of different sizes including (a) for small particles such as a virus, and (b) for larger particles such as pollen and dust.

The COVDA system is an ideal candidate to meet the needs of wide and frequent testing and ultrafast screening by the public. COVDA is based on optical techniques that can be used to test a glass slide after a person coughs or breaths on it to see if the person has a virus or in free space. Testing is based on the ratio of forward scattering intensity (FS) and back scattering intensity (BS); the scattering spectrum at a particular angle; and the fluorescence spectrum from key molecular content of the Spikes and Internal make-up structure of the virus such as amino acid Tryptophan and other UV spectral features. The bio-media molecules can be excited by UV LEDs and detected by photonics methods. The optical light scattering and spectral methods would be "instantaneous" (low latency) with "point-of-test" results. If the virus is confirmed present, then the person can mail the sample to further test for confirmation.

The COVDA units developed in accordance with this invention is an ideal candidate to meet the needs of wide and frequent testing by the public. The first testing system based on optical spectroscopy techniques can be used to test a glass slide after a person coughs or breaths on it to see if the person may have a virus. The testing is based on the 1) the ratio of forward scattering intensity (FS) and back scattering intensity (BS), 2) the scattering spectrum at a particular angle, and 3) the fluorescence spectrum from key molecular content of the Spikes and Internal make-up structure of the virus such as amino acids, such as tryptophan. The optical light scattering and spectral methods would be "instantaneous" (low latency) with "point-of-test" results. If the virus is confirmed present, then the person can mail the sample to further test for confirmation. Therefore, this invention, COVDA, is a pre-screening technique, which will generate reliable negative results. The false positives will be referred to and verified in a medical lab using a standard technique such as PCR. This invention will use optical spectroscopy and photonics technologies based on light scattering of small particles as well as molecular fluorescence spectroscopy.

A Compact Optical Virus Detection Analyzer (COVDA) device will be developed to rapidly detect viruses, including the coronavirus, based on the elastic light scattering and fluorescence properties of the virus. An artistic illustration of SARS-CoV-2 particle is shown in FIG. 1. The main innovations include (a) using ultraviolet (UV) in the range of 200-300 nm and elastic light scattering to detect viruses including the coronavirus based on their particle size and structure; and (b) use fluorescence of key biomolecules especially tryptophan (Trp) as a biomarker to detect coronavirus. Tables 1 and 2 show the absorptions and emissions of amino acids, and an estimate of each amino acid's contribution to the total fluorescence of a covid particle, respectively [8].

TABLE 1

| | Absorption | Fluorescence | |
|---|---|---|---|
| Amino Acid | Wavelength (nm) | Wavelength (nm) | Quantum Yield |
| Tryptophan (T) | 280 | 348 | 0.20 |
| Tyrosine (Y) | 274 | 303 | 0.14 |
| Phenylalanine (F) | 257 | 282 | 0.04 |

The breakdown of these amino acids in the viruses is shown in Table 1. Settled on fluorescence and found that Tryptophan, Tyrosine, and Phenylalanine are able to fluoresce. The absorption wavelengths, fluorescence wavelengths, and quantum yield for these amino acids.

TABLE 2

| Amino Acid | Approximate Constituent % | Approximate % of Fluorescence Intensity |
|---|---|---|
| Tryptophan (T) | 2 | 30 |
| Tyrosine (Y) | 5 | 52 |
| Phenylalanine (F) | 6 | 18 |

Table 2 contains the estimated contribution of each amino acid to the total fluorescence of the SARS-CoV-2 virus. There are substantial amounts of amino acids in the virus spikes.

Referring to FIG. 2, COVDA uses light scattering and fluorescence to detect nanometer (nm) and micrometer (μm) sized particles, such as biological particles. The COVDA can be used to detect viruses such as coronavirus including SAR-COV-2 responsible for COVID-19. This COVDA device will be used for prescreening, rapid detection of people and suspicious persons. Light sources in compact units will be a lamp such as Xenon or YAG ns or ps lasers to generate second harmonic generation (SHG) in like KDP or barium borate ("BBO") crystals to produce 200 nm to 265 nm pumps for emission, or green laser pointers at about 530 nm to get emitters at about 265 nm or LEDs from 250 nm to 300 nm for pumping the samples, e.g. at 250 nm to 289 nm to pump tryptophan and light scatter of nanometer particles of virus. The supercontinuum with SHG can be uses to pump the virus from 210 nm to 300 nm. In FIG. 2 a UV light source-including a UV LED is provided for generating a beam of light selected to detect bio particles within the size range of 20-200 nm. A stationary transparent slide is provided positioned in the path of the beam of light. On a surface of the slide there are applied bio particles to be analyzed. The bio particles are label-free and are applied onto the stationary slide during the analysis. The beam of light is used to generate both elastic scattering and intrinsic fluorescence signals from native fluorescent molecules in bio particles including at least the amino acids tryptophan, tyrosine and phenylalanine. Optical components are provided, including filters and photo diodes, for generating forward scattering light passing through the sample, for generating backscattering light after the sample is exposed to the beam of light and for generating intrinsic fluorescence signals and its spectra. On the downstream side of the sample holder (e.g. slide) there are provided a plurality of photodetectors, filters and optics that serve as detectors for the generated signals. Thus, there are provided at least three detectors or photodetection means as follows. A first photodetection means detects the forward scattering light. A second photodetection means is used for detecting the backscattering light. A third photodetection means is provided for detecting the fluorescence signal. The outputs of the photodetection means is applied to electronics for establishing the size of the bio particles by comparing the forward and back scattering lights. The electronics also provides means for establishing the concentrations of the fluorescent molecules including amino acids. The particle size and concentrations or compositions of the fluorescent molecules are combined to identify the bio particles by establishing the fingerprints of the bio particles including the presence of coronavirus.

The invention involves several steps:

STEP #1—measure the ratio of forward scattering to backscattering (FS/BS) of 100-nm polystyrene beads that mimic the coronavirus. A schematic block diagram of scattering and fluorescence units is shown in FIG. 2.

STEP #2—measure the fluorescence signal when the same 270-nm light shines on the slide. The light intensity after a selected narrow-band (NB) filter, e.g. ~340 nm is measured by a photo detector using filters and mini grating spectrograph. This is to detect the fluorophores in the virus such as tryptophan, lipids, proteins and RNA nucleotides. The whole spectrum is measured using a spectrometer in the advanced version using supercontinuum Q-switched nanosecond and picosecond with HG for 200 nm to 300 nm of the system. The absorption spectrum of tryptophan is shown in FIG. 3 showing 220 nm and 280 nm bands.

STEP #3—once the system is calibrated using the model samples, they are sent to be tested and evaluated for efficacy and detection sensitivity using viruses such as SARS-CoV-2. FIG. 10 shows the absorption spectra of Tryptophan in Fluorescence; and FIG. 11 shows a spectral graph showing the absorption spectra of tryptophan fluorescence as shown in FIG. 10.

In summary, the COVDA device can use both light scattering and fluorescence measurements to rapidly detect the coronavirus as a point-of-care system for at-home use. This device may drastically change the current testing situation for the coronavirus in the country that affects the control of the virus, the reopening of businesses and schools, and the recovery of the economy.

Scattering Based Testing Analyzer

Coronavirus virions are spherical, 120-160 nm in diameter, with an outer envelope bearing 20 nm-long club-shaped spike proteins that collectively resemble a crown or the solar corona [14]. Therefore, optical methods may be developed for detecting the virus based on the characteristic of light scattering by the virus. An artistic illustration and a transmission electron microscope (TEM) image for the coronavirus are shown in FIG. 4(*a*) and FIG. 4(*b*), respectively, that show the 100-nm central sphere and the spikes. The main molecular content of the virus consists of lipids, proteins, amino acids and RNA in a small nm size. When light encounters matter, various types of light-matter interactions occur. When light interacts with small particles, one of the most important interactions is scattering. The process of light scattering may be considered as a complex interaction between the incident electromagnetic wave and the molecular/atomic structure of the scattering particles. A particle that is exposed to optical and UV light can be thought of as an optical antenna. The majority of light scattered by the particle is emitted at the same frequency of the incident light, a process referred to as elastic scattering. There are mainly two light scattering theory frameworks [15]. One is Rayleigh scattering (after Lord Rayleigh) that was originally formulated to be applicable to small dielectric (non-absorbing) spherical particles. The second one is Mie scattering (after Gustav Mie) or Lorentz-Mie scattering that provides the general spherical scattering solution (absorbing or non-absorbing) without a particular bound on particle size. Therefore, Mie theory has no size limitations and converges to the limit of geometric optics for large particles as well as Rayleigh scattering for small particles. Mie theory may be used for describing most spherical particle scattering systems, including Rayleigh scattering.

The size parameter of a particle is defined to be $x=2\pi a/\lambda=ka$, where a is the radius of the spherical particle, $\lambda$ is the wavelength of the light in the medium. Therefore, $\lambda=\lambda_o/m_o$, $\lambda_o$ is the wavelength in vacuum and $m_o=n_o-ik_o$ is the complex index of refraction of the surrounding medium. In contrast, $m_p$ is the complex index of refraction of the particle, with $m_p=n_p-ik_p$. Here n is the ordinary refractive index with n=v/c; v and c are the speeds of light in the material and in vacuum respectively; k is related to absorption. If the absorption is ignored in the problem and the medium is air, we have k=0, m=n, $m_o\approx 1$, and $\lambda\approx\lambda_o$. The value of x describes the size of the particle relative to the wavelength.

When the particles are much smaller than the wavelength, with x<<1, Rayleigh scattering theory can be applied. For example, when visible light is scattered by air molecules, it follows Rayleigh scattering. The scattered light is the same for any azimuthal angle $\phi$ for a particular scattering angle $\theta$, meaning the scattering is rotationally symmetrical around the axis at forward direction. As indicated in FIGS. 5 and 6, the intensity $I_s$ of light at scattering angle $\theta$ integrated over $2\pi$ azimuthal angle $\phi$ scattered by a small spherical particle of radius a and refractive index n from a beam of unpolarized light of wavelength $\lambda$ and intensity $I_o$ is given by $$I_s = I_o\frac{8\pi^4 a^6}{r^2\lambda^4}\left(\frac{n^2-1}{n^2+2}\right)^2\left(1+\cos^2\theta\right) = I_o\frac{x^6\lambda^2}{8\pi^2 r^2}\left(\frac{n^2-1}{n^2+2}\right)^2\left(1+\cos^2\theta\right)$$

where r is the distance to the particle. The forward and back scattered light intensities are the equal. According to Rayleigh scattering, when the particle size increases with respect to the wavelength, the scattered light intensity increases.

If the particle size becomes comparable to wavelength of light, the forward-scattered light becomes stronger than back-scattered light. In the meantime, the peak polarization decreases and shifts to larger angles. The Mie scattering theory is needed to describe the scattering.

As the size increases further, the asymmetry in the scatted wave becomes more pronounced and dominant forward scattering lobe narrows. If the light with wavelength of ~270 nm interacts with the coronavirus, the light scattered by the central sphere of ~100 nm is expected to follow Mie scattering, while the interaction with the spike proteins is expected to follow Rayleigh scattering limit. When the distance r is large compared to the wavelength of light, the interaction can be described by Fraunhofer diffraction theory [16]. In this case, the scattering due to a particle is similar to the diffraction due to a single aperture. The first order of destructive fringe for the diffraction can be found approximately at angle $\theta_s\approx\lambda/a$ for small angles. A small particle with respect to wavelength scatters light into all angles while a large particle mainly scatters light forwardly. As Fraunhofer diffraction indicated, for smaller particles, the zeroth order bright fringe becomes wider, the first dark fringe is found at a larger angle, meaning the light is scattered into a larger angle. Schematic diagrams in FIG. 6 show light scattering with particles of different sizes.

If the particle further increases and becomes large relative to the wavelength of the light, Mie scattering converges to geometric optics and the interaction may be interpreted in terms of refraction.

Mie theory starts from Maxwell's equations for an electromagnetic field and results in an exact description of the field when an interaction takes place between the light and small particles. In the far-field zone (i.e., at the large distances r from a sphere), for a spherical particle scatterer, the amplitudes of the scattered wave is [15]

$$\begin{pmatrix} E_{\parallel}^s \\ E_{\perp}^s \end{pmatrix} = \frac{e^{ik(r-z)}}{ikr} \begin{pmatrix} S_2(\theta) & 0 \\ 0 & S_1(\theta) \end{pmatrix} \begin{pmatrix} E_{\parallel}^i \\ E_{\perp}^i \end{pmatrix}.$$

The Mie scattering amplitudes $S_1(\theta)$ and $S_2(\theta)$ are $$S_1(\theta) = \sum_{n=1}^{\infty} \frac{2n+1}{n(n+1)}[a_n\pi_n(\cos\theta) + b_n\tau_n(\cos\theta)]$$

$$S_2(\theta) = \sum_{n=1}^{\infty} \frac{2n+1}{n(n+1)}[b_n\pi_n(\cos\theta) + a_n\tau_n(\cos\theta)]$$

where $$\pi_n(\cos\theta) = \frac{1}{\sin\theta}P_n^{(1)}(\cos\theta)$$

$$\tau_n(\cos\theta) = \frac{d}{d\theta}P_n^{(1)}(\cos\theta)$$

where $P_n^1$ are the associated Legendre polynomials, and parameters $a_n$ and $b_n$ are $$a_n = \frac{m\Psi_n(mx)\Psi_n'(x) - \Psi_n(x)\Psi_n'(mx)}{m\Psi_n(mx)\xi_n'(x) - \xi_n(x)\Psi_n'(mx)}$$

$$b_n = \frac{\Psi_n(mx)\Psi_n'(x) - m\Psi_n(x)\Psi_n'(mx)}{\Psi_n(mx)\xi_n'(x) - m\xi_n(x)\Psi_n'(mx)}$$

where m is the relative complex refractive index $m_p/m_o$ or $n_p/n_o$ for non-absorbing case, $\Psi$ and $\xi$ are related to spherical Bessel functions. The scattered intensities are proportional to the squares of the absolute values of these amplitudes.

Figure 7:
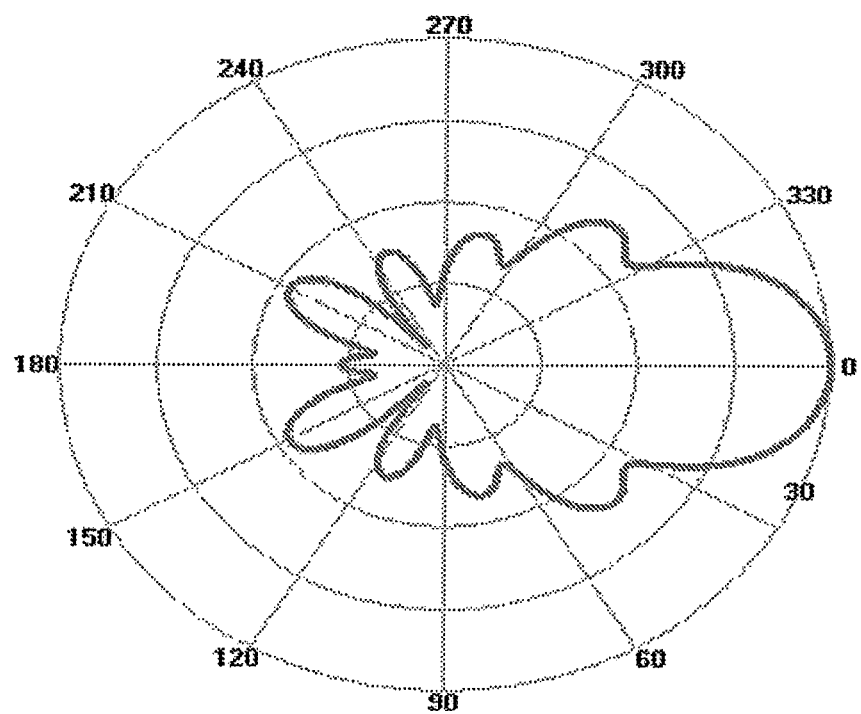
FIG. 7 shows an example of a polar plot of scattered intensity vs. scattering angle for Mie scattering ($\lambda=1$ μm, r=1 μm) created using MiePlot [4, 5]

Therefore, the scattered light intensity is a function of angle, wavelength, as well as the relative refractive index and size of the particles. The particle scatters the light of a particular wavelength into different directions. The angular distribution of the scattered wave is affected by the particle size very sensitively, which provides means of evaluating particle size based on light scattering. An example polar plot of scattered wave due to Mie scattering is shown in FIG. 7.

For a particular type of particle, the size of particle can be evaluated or obtained based on the angular distribution of scattered light of a particular wavelength. The laser diffraction (LD) technique measures the scattering of a fixed frequency of light over a range of angles [16, 17]. For simplicity, in this invention, we measure the ratio between two angles such as FS and BS to evaluate the particle size. The ratio of the FS at 0° and BS at 180° is [15]

$$\frac{FS}{BS} \approx 1 + \frac{4x^2(m^2+4)(m^2+2)}{15(2m^2+3)}$$

where m and x are defined above. To avoid incident light, measurement could be taken at a small angle off 0° for FS.

Figure 8:
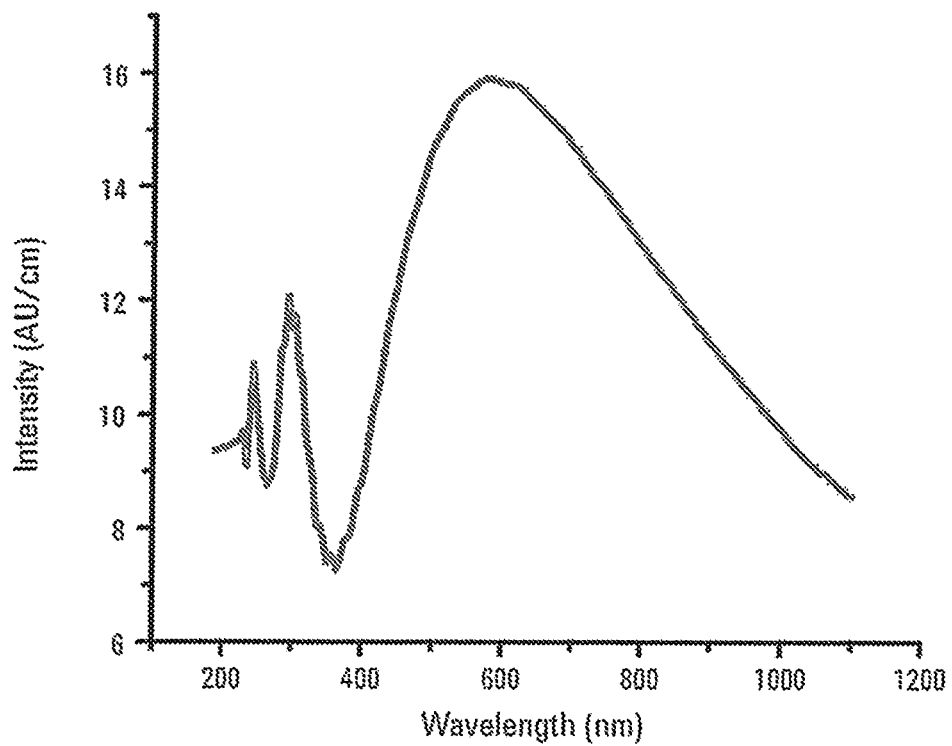
FIG. 8 is a plot showing the intensity of white light as a function of wavelength at a fixed scattering angle for a dispersion of 1.5 μm polystyrene particles in water [2]

Since the scattering is also a function of the wavelength, the particle size can also be evaluated based on the spectral distribution of the scattered light, i.e. scattering spectrum collected at a particular scattering angle [18]. An example scattering spectrum due to 1.5 μm polystyrene particles in water is shown in FIG. 8 from 200 nm to 1200 nm. Alternatively, discrete wavelengths of the scattered light can be measured at a particular angle to evaluate the particle size for simplicity. A supercontinuum laser or uv lamp can be used for scattering.

If there are particles of multiple sizes, the observed measurement of intensity can be deconvoluted into sets of particle sizes that could have produced the result which is an ill-posed problem. A multivariate analysis algorithm such as nonnegative matrix factorization (NMF) [19, 20] may be used for the linear unmixing.

The scattered light may also be used to obtain further information about the virus [21]. One of the important features of the coronavirus is the presence of a certain number of spike proteins on its surface, forming around the virus a kind of solar corona [22]. Using these spikes, the coronavirus enters host cells. The number of the spike proteins is an indicator of the degree of danger of a given set of virions [23]. It has been shown that the scattered light intensity and polarization as a function of scattering angle and wavelength for a particular size of model coronavirus particle are also affected by the number of spikes on the particle [21]. Therefore, the number of the spike proteins as well as the virion structure may also be evaluated based on the characteristics of the scattered light [21].

COVDA Fluorescence Based Testing Analyzer

Another specific optical spectroscopy photonic method for COVDA used to detect the coronavirus using the invented analyzer system is based on fluorescence. We have used native fluorescence (commonly noted as autofluorescence) and Raman spectroscopy to detect cancers [24-27] and bacteria [28] from molecules inside the species.

In biological samples, there are various key fluorophores that can provide fluorescence signal, such as tryptophan [29, 30], proteins, lipids [31], nucleotides [32] etc. Since the coronavirus is made up of RNA nucleotides, proteins and lipids [33], it can potentially be detected using fluorescence techniques [24, 25]. In particular, the spike protein (characteristic SARS-CoV-2 structure) has a tryptophan rich N terminal region [34]. The excitation and emission peaks of tryptophan (Trp) are ~270 nm, ~340 nm, respectively [30]. This Trp spectral feature is a key fingerprint to emit light about 340 nm upon excitation from 250 nm to 290 nm detecting a sample that maybe loaded with SARS-CoV-2.

Figure 1:
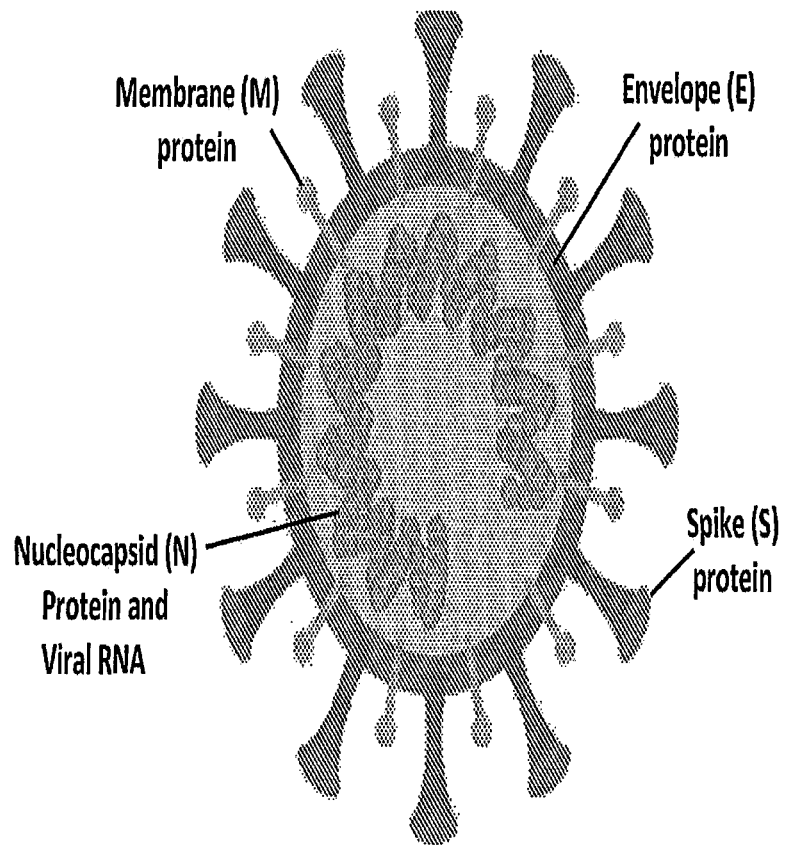
FIG. 1 is an artistic illustration of a transmission electron microscope (TEM) image of the coronavirus SARS-CoV2 structure, the spikes contain tryptophan and other amino acids as listed in Tables 1 and 2.
Figure 2:
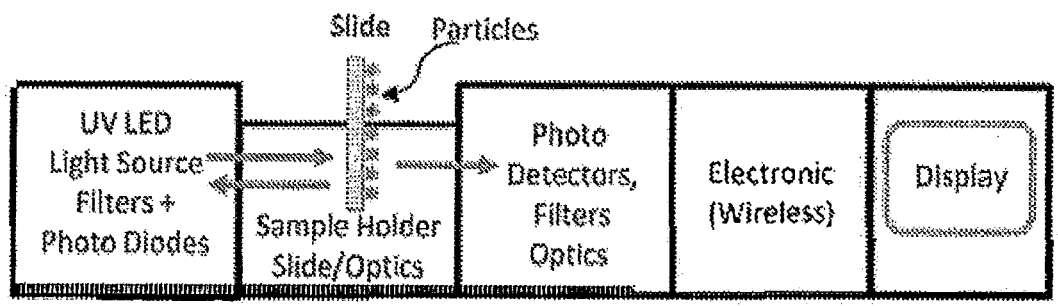
FIG. 2 is a schematic block diagram of scattering and fluorescence in accordance with the invention.
Figure 3:
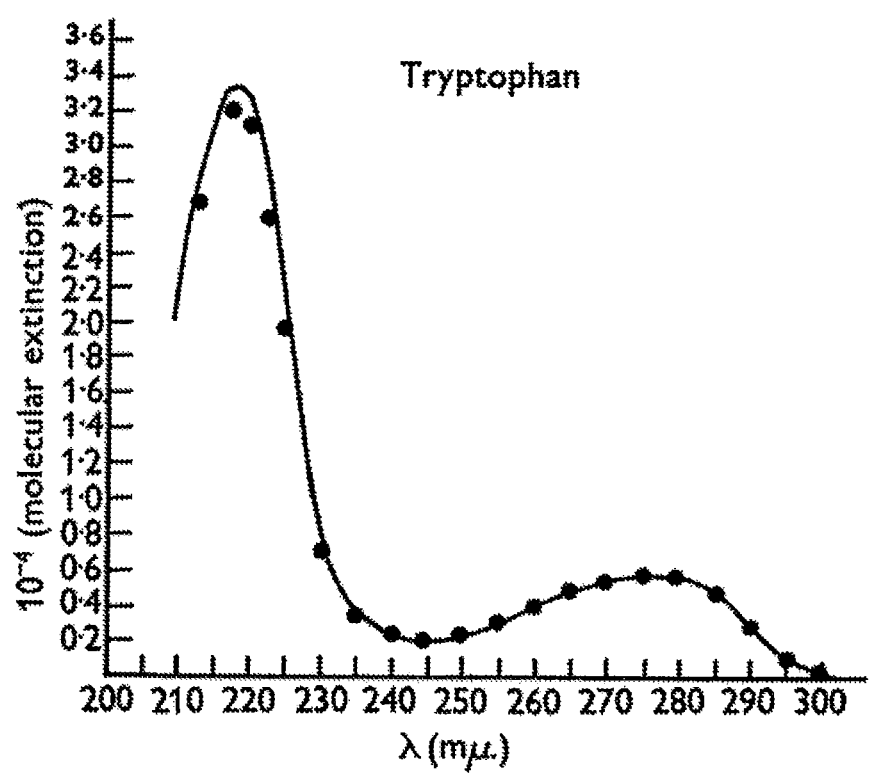
FIG. 3 is a graph showing the absorption spectra of Tryptophan with peaks about 210 nm to 220 nm and 260 nm to 290 nm.
Figure 4A:
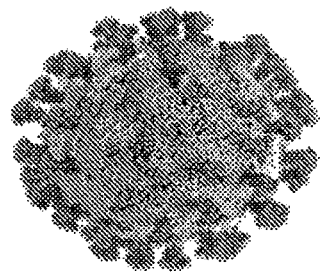
FIG. 4(a) is an illustration created of the virus by the CDC [1]; and 4(b) is an enhanced TEM image of the coronavirus [3]
Figure 4B:
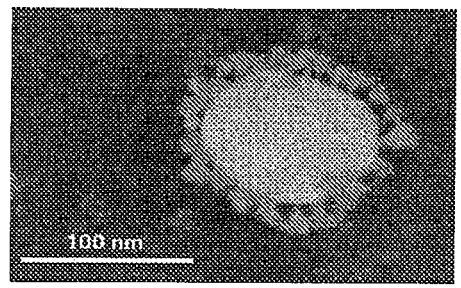
Figure 5:
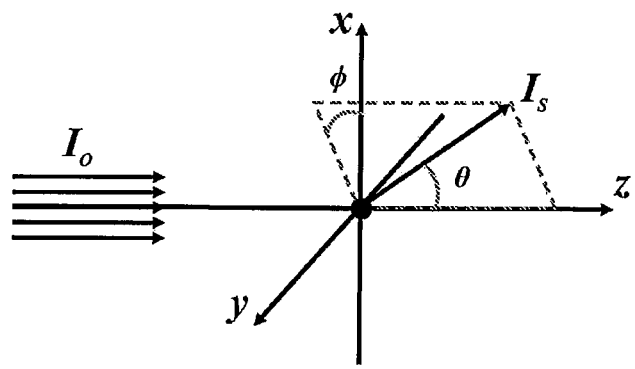
FIG. 5 is a schematic diagram that illustrates light scattering with a particle at the origin, where $I_o$ is the incident light, $I_s$ is the light scattered at angles ($\theta$, $\phi$)
Figure 9:
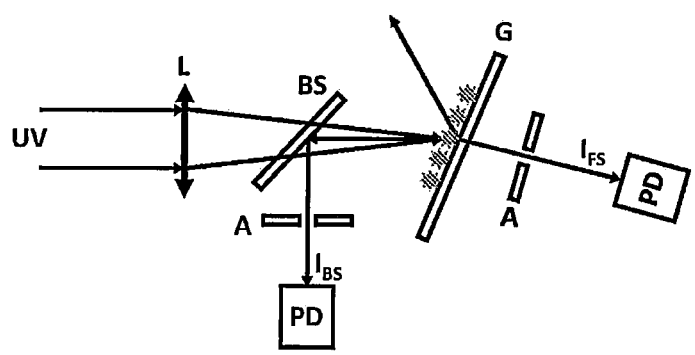
FIG. 9 shows a schematic diagram for the design and operation of the system (L: lens, BS: beam splitter, A: aperture, PD: photo detector, G: glass slide, UV: incident beam, $I_{BS}$: backscattering, $I_{FS}$: forward scattering)
Figure 10:
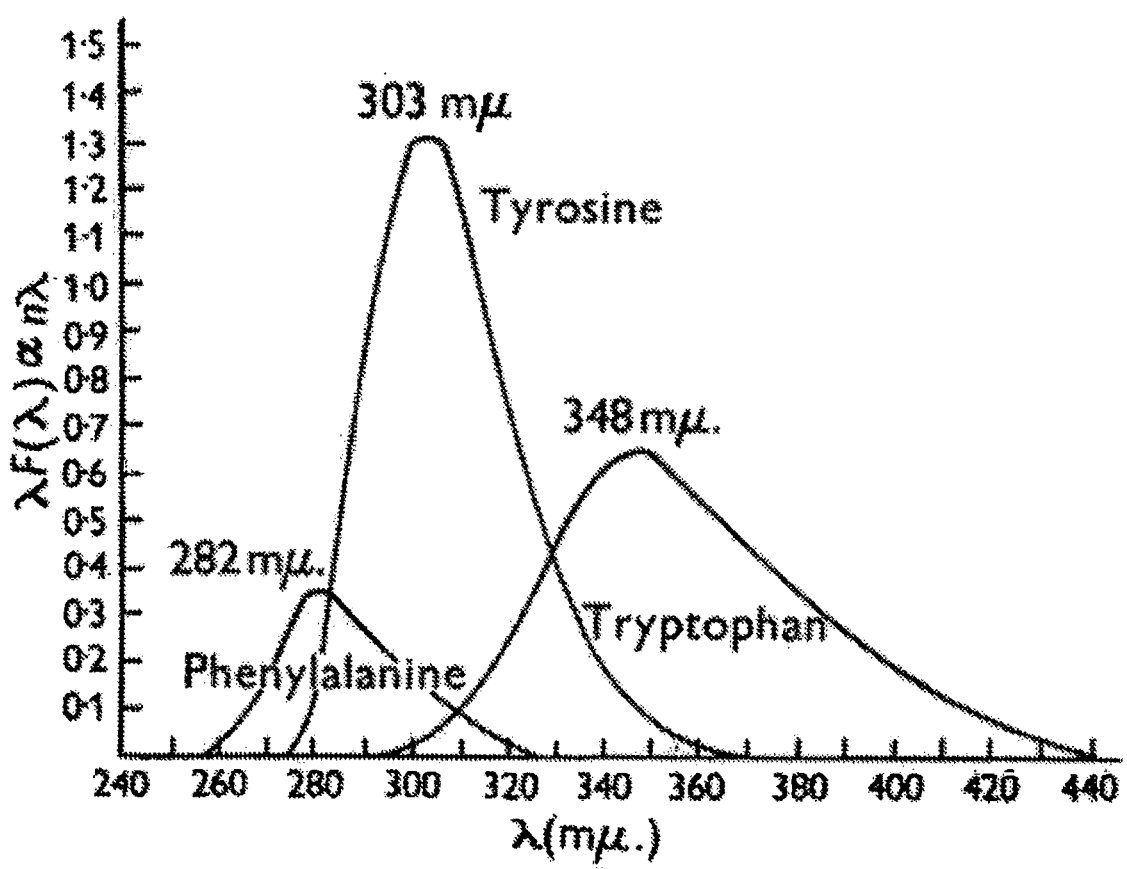
FIG. 10 shows the absorption spectra of Tryptophan in Fluorescence.
Figure 11:
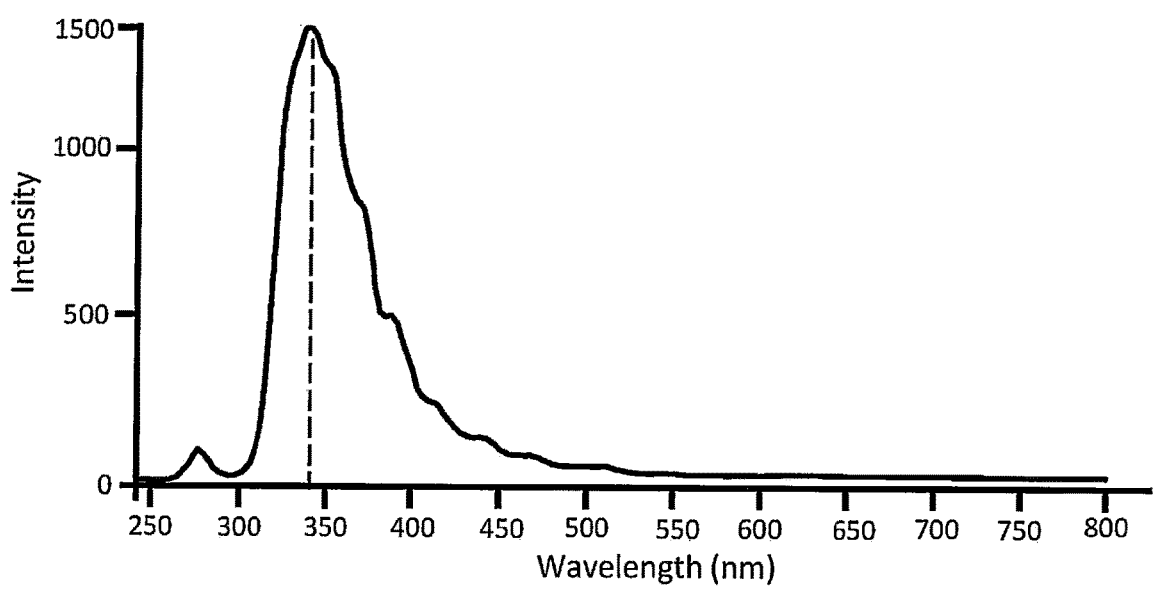
FIG. 11 shows a spectral graph showing the absorption spectra of tryptophan fluorescence as shown in FIG. 10.

In this invention, a COVDA device uses light scattering and fluorescence properties of the virus. A schematic diagram of one embodiment of the device in accordance with the invention is shown in FIG. 2 for the design of the device, and FIG. 9 shows the light paths for scattering with the virus.

In this invention the COVDA systems implement the following:
  1. The system is set up to measure the ratio of forward scattering to backscattering (FS/BS) of 100-nm polystyrene beads that mimic the coronavirus. As shown in FIG. 9, a 250-nm and a 270-nm UV LEDs as well as Xenon Lamp 150 nm-400 nm light sources or supercontinuum laser source will be used in the system. The fourth harmonic of NIR laser from 1064 from Q switched Nd Laser at about 10 nsec or the second harmonic of second harmonic from NIR laser for field at 265 nm. The LED light will be converged using a positive lens. The beam goes through a beam splitter, and strike on the particles on an anti-reflection ("AR") coated beam glass slide. The glass slide is tilted at an angle, e.g. 10-20°, so that the small amount of reflected light will be directed upwards (as indicated in the figure). The directly backscattered light goes back and is reflected by the beam splitter downwards (as indicated in the figure) and then collected by a photo diode. The forward scattered light passes the glass slide, and continues towards another photo diode, which is placed at an angle slightly off 0° such as 5° to avoid direct incident beam. The FS/FS ratio formula will also be corrected from the equation shown above. In fact, a simplified version of the detection system can also perform the measurement at another scattering angle without using the beam splitter. The FS/BS ratio can be measured for different particle size for comparison. This way, the unknown particle size can be compared and estimated based on the experimental FS/BS ratio curves.

In the meantime, intensity ratio at each angle is obtained between the two wavelengths. Similarly, the ratio for different particle size can be obtained and used to estimate the particle size. If there are various types of particles with different sizes, the whole spectrum of the scattered light can be measured and deconvoluted to retrieve the size distribution. A spectrometer can be integrated into an advanced version of the system to measure the spectrum of the sample to determine the size of the particles.

Light sources in compact units will be either a lamp such as Xe with narrow band filters, AlN LEDs, or laser diode, high power ns/ps laser source to generate SHG in like KDP, BBO crystals to produce 200 nm to 250 nm emission, and green laser pointers at about 530 nm to get emitters at about 270 nm, or LEDS from 250 nm to 300 nm for pumping the samples at 250 nm to 289 nm to pump tryptophan and light scatter of nanometer particles of viruses.

The system measures the fluorescence signal when the same 270-nm to 290 nm AlN LEDs light or laser diode and SHG crystal shines on the slide with nm and um particles The light intensity after a selected narrow-band filter, e.g. ~340 nm is measured by a photo Once the system is calibrated using non-virus nanoparticles, it can be sent for testing. It will first be tested in a collaborated BLS-2 lab for detection of inactivated coronavirus. After that, the device will be sent to a BSL-3/4 (i.e. P3/4) lab for final testing for coronavirus.

The invention, a compact UV LED analyzer COVDA ratiometer, can be used to rapidly detect viruses, such as the coronavirus, based on the elastic light scattering and fluorescence properties of the virus. More specifically, this compact optical analyzer device will be able to (a) detect 100-nm particles (e.g. polystyrene beads) that mimic coronavirus on an anti-reflection (AR) coated glass slide using appropriate light sources with a wavelength within 200 nm-300 nm from LEDs, including aluminum nitride (AlN) laser diodes and/or solid state lasers such as high power glass or YAG lasers with harmonic generation to obtain nanosecond or picosecond laser pulses based on the ratio of forward scattering and backscattering (angular dependence) as well as scattering spectrum (wavelength dependence); (b) detect fluorescence signals of tryptophan, proteins, lipids and mixture of nucleotides with 270-nm LEDs. Light sources in compact units will be either a lamp such as Xe with narrow band filters; or laser diode in blue from 400 nm to 500 nm to generate SHG in like BBO crystals to produce 200 nm to 250 nm emission, and green laser pointers at about 530 nm to get emitters at about 270 nm using SHG; or LEDs from 250 nm to 300 nm or harmonic from Q switched laser at about 265 nm for pumping the samples at 250 nm to 289 nm to pump tryptophan and light scatter of nanometer particles of virus.

A diagnostic assay for SARS-CoV-2 should be capable of distinguishing among the common upper respiratory viruses that could potentially display cross-reactivity with SARS-CoV-2, including flu viruses and Rhinoviruses, responsible for the common cold. The coronavirus such as SARS-CoV-2 has a particle size of 20-200 nm, which can be measured by elastic light scattering. The spike protein (characteristic coronavirus structure) has a tryptophan (Trp) rich N terminal region. The excitation and emission peaks of Trp are ~270 and ~340 nm, respectively. This Trp spectral feature is a key fingerprint to detecting the sample that maybe loaded with SARS-CoV-2. It should be noted, however, that this assay will not distinguish between SARS-CoV-2 and the presence of other human Coronaviruses that cause the common cold due to their structural and biochemical similarities. Thus, a positive test result, in the absence of symptoms specifically associated with COVID-19, would require further confirmation. That being said, the proposed assay instrument could be used to distinguish SARS-CoV-2 infection from flu or Rhinovirus infections due to fundamental differences in their structural and biochemical parameters that can be detected by UV elastic light scattering and fluorescence spectra that are capable of distinguishing among the structural/biochemical properties of the different virus Families.

This compact Optical Virus Analyzer Device (COVDA) will be used as a point-of-care system for at-home use. When deployed, the system will use both light elastic scattering and fluorescence spectroscopy to detect the virus. Once a signal from the slide with particles from human breath or saliva is detected with particle size being 100 to 200 nm and expected fluorescence spectra, the slide can be sent to a lab to be further tested for confirmation. Therefore, this invention will serve as a pre-screening technique, which will generate reliable negative results. The false positives can be verified in a lab using standard method such as PCR.

This invention can drastically change the current testing situation for the coronavirus in the country which is affects the control of the virus, the reopening of businesses and schools, and the recovery of the economy.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A label-free method of detecting optical bio particles comprising the steps of providing an ultraviolet (UV) light source for generating a beam of light, said light source being selected for detecting bio particles within the size range of 20-200 nm; providing a transparent sample holder positioned in the path of said beam of light; applying a sample that may contain bio particles sought to be detected onto said transparent sample holder and exposing said sample to said beam of light, said beam of light being directed at said sample by optical components, said sample when interacting with the said beam of light generates both elastic scattering and intrinsic fluorescence signal from native fluorescent molecules in bio particles including at least amino acids tryptophan, tyrosine and phenylalanine; directing forward scattering light passing through said sample holder, directing backscattering light after the sample is exposed to said beam of light and directing intrinsic fluorescence signal and its spectra; detecting said forward scattering light; detecting said backscattering light; detecting said fluorescence signals; establishing the size of bio particles by comparing said forward scattering and backscattering lights based on Mie scattering; and estimating the relative concentrations of said native fluorescent molecules based on the contributions of the fluorescence signals of the fluorescent molecules to the detected fluorescence signals being measured by using at least one of a photo detector and a filter or a spectrometer, said contributions of the fluorescent molecules to the detected fluorescence signals being retrieved from the detected signals by using signal processing means, the particle size and relative concentrations of the native fluorescent molecules including amino acids are both used to identify the bio particles that may be present in the sample by comparing experimental values of the particle size and relative concentrations of the fluorescent molecules to known values of established bio particles, said UV light source generating UV light within the range of 200-300 nm from LEDs, including aluminum nitride (AlN), laser diodes and/or solid state lasers solid state lasers such as high power glass or YAG laser with harmonic generation to obtain nanosecond or picosecond laser pulses for detecting nano and micro particles using light emitted or scattered.

2. The method of detecting optical bio particles as defined in claim 1, wherein a Q SWITCHED nanosecond (ns) or picosecond (ps) MODE LOCKED LASER, including Nd-YAG or GLASS LASER, Ti sapphire, with harmonic generators is used to create high power uv in the range 200 nm to 300 nm around the peak 270 nm for animo acids with pulse energy >1 mJ and >15 Hertz repetition rate to provide average power of >15 mW to destroy and kill viruses and bacteria in free space and on surfaces.

3. The method of detecting optical bio particles as defined in claim 1, wherein said forward scattering and backscattering light assume different angles of propagation and the size of the bio particles is determined using a ratio of the intensities of the forward and backscattering lights relative to the direction of propagation of said beam of light.

4. A label-free optical bio particle detection analyzer comprising an ultraviolet (UV) light source for generating a beam of light, said beam of light having a wavelength selected to be within the range of 200-300 nm for use in detection of bio particles within the size range of 20-200 nm; a label-free sample; a stationary transparent sample holder positioned in the path of said beam of light for supporting said sample that may contain bio particles sought to be detected, said beam of light being directed at the said sample by optical components; the sample when interacting with the said beam of light generating both elastic scattering and intrinsic fluorescence signals from native fluorescent molecules in bio particles including at least amino acids tryptophan, tyrosine and phenylalanine, said optical components directing forward scattering light passing through said sample holder, and directing backscattering light after the sample is exposed to said beam of light and for directing intrinsic fluorescence signals and its spectra; first photodetection means for detecting said forward scattering light; second photodetection means for detecting said backscattering light; third photodetection means for detecting said fluorescence signal; signal processing means for establishing the size of bio particles by comparing said forward scattering and backscattering lights based on Mie scattering; and means for estimating the relative concentrations of said native fluorescent molecules based on the contributions of the fluorescent molecules to the detected fluorescence signals being measured by using at least one of a photo detector and a filter or a spectrometer, said contributions of the fluorescent molecules to the detected fluorescence signals being retrieved from the detected signals by using signal processing means; the particle size and relative concentrations of the native fluorescent molecules including amino acids are both used to identify the bio particles that may be present in the sample by comparing the experimental values of the particle size and relative concentrations of the fluorescent molecules to the known values of established bio particles.

5. The optical bio particle detection analyzer defined in claim 4, wherein said light source uses ultraviolet (UV) light within the range of 200-300 nm from LEDs, including aluminum nitride (AlN), laser diodes and/or HIGH solid state lasers such as high power glass or YAG laser with harmonic generation to obtain nanosecond or picosecond laser pulses for detecting nano and micro particles using light emitted or scattered.

6. The optical bio particle detection analyzer defined in claim 5, wherein at least one of said first and second photodetection means comprises a photodetector used for detecting the bio particles that are uv sensitive for time delay imaging and said third photodetection means comprises spectral analyzers using a photodetector and an optical filter or a spectrometer.

7. The optical bio particle detection analyzer defined in claim 5, wherein time resolved timing from an emitted region can be resolved using remote time delay T=2 L/c to measure the region and extend at distance L away where c is the speed of light.

8. The optical bio particle detection analyzer defined in claim 4, wherein said light source is selected for detecting tryptophan fluorescence as a bio marker in a sample from a human person or animal to detect presence of viruses and/or bacteria from saliva, spit, blood, or breath from lung applied to said sample holder.

9. The optical bio particle detection analyzer defined in claim 4, wherein said means for establishing particle size uses a forward to back scattering ratio to establish the sizes of nano and micro particles.

10. The optical bio particle detection analyzer defined in claim 4, wherein said light source is selected for detecting bio particles within the nano (nm) and micro (um) size range based on the angular pattern of elastic light scattering of the particles.

11. The optical bio particle detection analyzer defined in claim 4, wherein said light source is selected for detecting 20 nm spikes on bio particles within the nm and pm size range to detect viruses, including coronaviruses including the coronavirus SARS-CoV-2.

12. The optical bio particle detection analyzer defined in claim 4, wherein said light source is selected for stimulating fluorescence originating from tryptophan, tyrosine and phenylalanine present in proteins and lipids to determine the presence of bio particles such as viruses, including coronaviruses in the sample.

13. The optical bio particle detection analyzer defined in claim 4, wherein said light source is selected for generating both elastic light scattering and fluorescence to detect nm and pm sized particles including viruses, bacteria, and pollens.

14. The optical bio particle detection analyzer defined in claim 4, wherein said light source stimulates emission of visible light from 300 nm to 600 nm from said sample to detect molecules including collagen, and NADH and flavins molecules in cells.

15. The optical bio particle detection analyzer defined in claim 4, wherein said third photodetection means is selected to detect fluorescence from tryptophan in a spike of a virus as a fingerprint with excitation at 230 nm to 300 nm and emission in the range of 320 nm to 360 nm as a key marker for tryptophan.

16. The optical bio particle detection analyzer defined in claim 4, wherein said light source comprises a lamp, including Xe, with narrow band filters, aluminum nitride (AlN) LEDs or laser diode, or Q-SWITCHED mode-locked Nd:YAG or glass laser or Ti:Sapphire laser for nanosecond (ns) or picosecond (ps) pulsed beam to generate SHG in KPD or BBO crystals to produce 200 nm to 250 nm emission, and green laser pointers with SHG and LEDs to obtain emission from 250 nm to 300 nm for pumping the sample including pumping tryptophan to obtain fluorescence and light scattering of nanometer particles of viruses.

17. The optical bio particle detection analyzer defined in claim 4, wherein said optical components include a beam splitter between said light source and the sample holder, said sample holder being offset at an angle from a direction normal to a direction of propagation of said beam of light.

* * * * *